United States Patent
Rose et al.

(10) Patent No.: US 12,361,121 B2
(45) Date of Patent: Jul. 15, 2025

(54) ADAPTIVE DATA SELECTION AND REPORTING

(71) Applicant: Nightwing Group, LLC, Dulles, VA (US)

(72) Inventors: Daniel Rose, Salado, TX (US); Torsten Staab, Bristow, VA (US); Travis Durbin, Pinehurst, NC (US)

(73) Assignee: NIGHTWING GROUP, LLC, New York, NY (US)

( * ) Notice: Subject to any disclaimer, the term of this patent is extended or adjusted under 35 U.S.C. 154(b) by 249 days.

(21) Appl. No.: 18/059,095

(22) Filed: Nov. 28, 2022

(65) Prior Publication Data

US 2023/0195888 A1   Jun. 22, 2023

Related U.S. Application Data

(60) Provisional application No. 63/292,690, filed on Dec. 22, 2021.

(51) Int. Cl.
*G06F 21/55* (2013.01)

(52) U.S. Cl.
CPC ...... *G06F 21/552* (2013.01); *G06F 2221/034* (2013.01)

(58) Field of Classification Search
CPC ....... G06F 21/55; G06F 21/552; G06F 21/554
See application file for complete search history.

(56) References Cited

U.S. PATENT DOCUMENTS

| | | | |
|---|---|---|---|
| 7,979,302 B2 | 7/2011 | Crysel et al. | |
| 11,283,819 B2 * | 3/2022 | Choi | G06N 3/08 |
| 11,637,862 B1 * | 4/2023 | Sopan | G06N 5/025 |
| | | | 726/23 |
| 2009/0254970 A1 * | 10/2009 | Agarwal | G06F 21/554 |
| | | | 726/1 |
| 2019/0312890 A1 * | 10/2019 | Perilli | H04L 63/145 |
| 2020/0285737 A1 * | 9/2020 | Kraus | G06F 21/552 |
| 2022/0060489 A1 * | 2/2022 | Moore | H04L 63/1425 |

FOREIGN PATENT DOCUMENTS

| | | | | |
|---|---|---|---|---|
| CN | 110225057 A | * | 9/2019 | ............ G06F 21/56 |
| CN | 111444293 | | 7/2020 | |
| CN | 111538731 | | 8/2020 | |
| EP | 2 249 299 | | 11/2010 | |

OTHER PUBLICATIONS

Ying Ding, A Virus detection method, device, equipment and system for intelligent terminal, Sep. 10, 2019 (Year: 2019).*
Zhang et al. "Artificial intelligence in recommender systems", Complex & Intelligent Systems, vol. 7, Nov. 1, 2020, 19 pages.

* cited by examiner

*Primary Examiner* — Olugbenga O Idowu
(74) *Attorney, Agent, or Firm* — Cowan, Liebowitz & Latman, P.C.; Mark Montague

(57) ABSTRACT

A method, comprising: detecting a first cyber event; instantiating a report, the report including an identifier corresponding to the first cyber event; generating a signature for a system log and classifying the signature for the system log with a first neural network; and adding the system log to the report based on an outcome of the classification of the signature for the system log, wherein the system log is added to the report only when the signature for the system log is classified into a predetermined category.

29 Claims, 8 Drawing Sheets

ADAPTIVE DATA SELECTION AND REPORTING

CROSS REFERENCE TO RELATED APPLICATION

The present application claims the benefit of U.S. Provisional Patent Application No. 63/292,690, entitled "ADAPTIVE DATA SELECTION AND REPORTING" and filed on Dec. 22, 2021, which is herein incorporated by reference in its entirety.

BACKGROUND

Computer security is the protection of computer systems and networks from unauthorized access, theft of information, as well as disruption, and information theft. Computer security professionals routinely process large data streams to identify security issues and discover remediation methods. Prompt identification and remediation of security issues is vital for the safe operation of entire sectors of government and industry, such as the defense and financial sectors for example.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

According to aspects of the disclosure, a method is provided, comprising: detecting a first cyber event; instantiating a report, the report including an identifier corresponding to the first cyber event; generating a signature for a system log with associated data items and classifying the signature for the system log with a first neural network; and adding the system log to the report based on an outcome of the classification of the signature for the system log, wherein the system log is added to the report only when the signature for the system log is classified into a predetermined category.

According to aspects of the disclosure, a system is provided, comprising: a memory; and at least one processor operatively coupled to the memory, the at least one processor being configured to perform the operations of: detecting a first cyber event; instantiating a report, the report including an identifier corresponding to the first cyber event; generating a signature for a system log and classifying the signature for the system log with a first neural network; and adding the system log to the report based on an outcome of the classification of the signature for the system log, wherein the system log is added to the report only when the signature for the system log is classified into a predetermined category.

According to aspects of the disclosure, a non-transitory computer-readable medium is provided that stores one or more processor-executable instructions which, when executed by at least processor, cause the at least one processor to perform the operations of: detecting a first cyber event; instantiating a report, the report including an identifier corresponding to the first cyber event; generating a signature for a system log and classifying the signature for the system log with a first neural network; and adding the system log to the report based on an outcome of the classification of the signature for the system log, wherein the system log is added to the report only when the signature for the system log is classified into a predetermined category.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figures 1, 2:
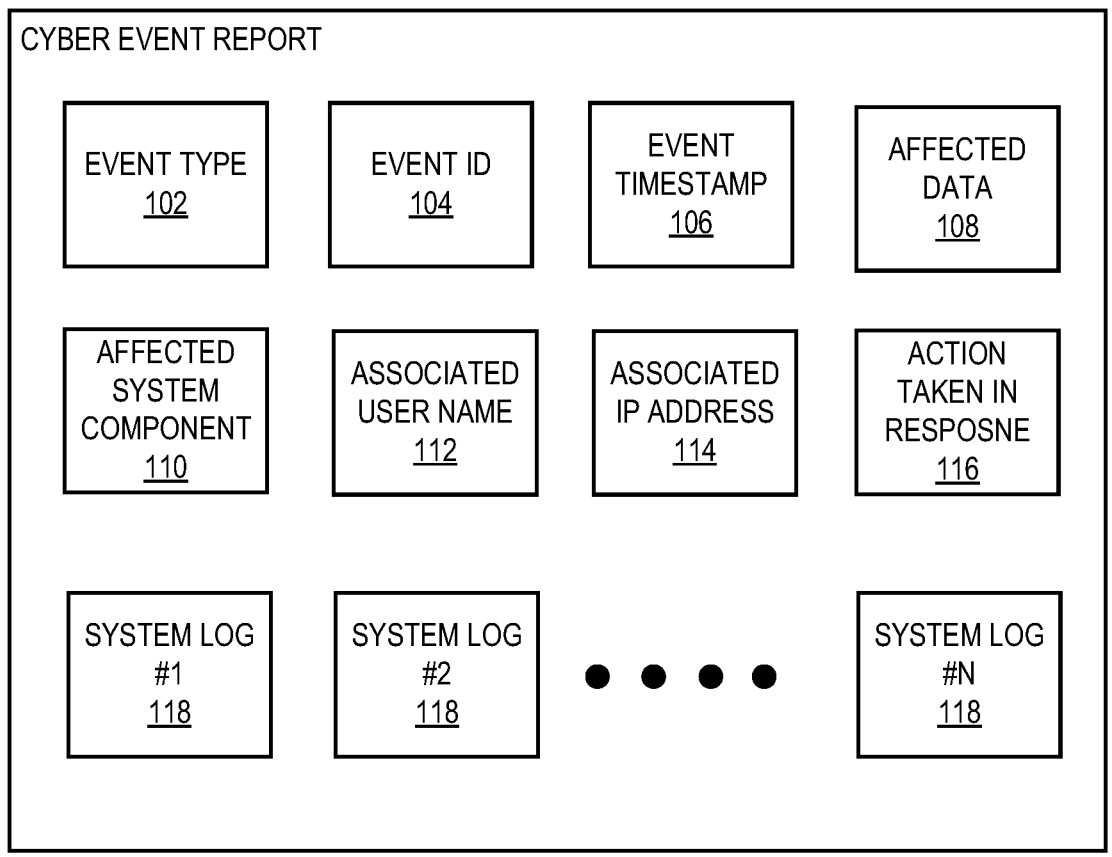
FIG. 1 is a diagram of an example of a cyber event report, according to aspects of the disclosure.
FIG. 2 is a diagram of an example of a cyber event report model, according to aspects of the disclosure.

A cyber event may be a security-related event in a computer system or computer network. Examples of cyber-events include unauthorized access of data, unauthorized use of a USB stick, the execution of an unauthorized process, access of data at odd times of the day and night, and/or any other suspicious activity. A cyber event may be generated by network introspection software, intrusion detection software, an anti-virus program, a firewall, and/or any other software. Alternatively, a cyber event may be generated manually by an IT analyst.

Large data streams are routinely processed by IT or cyber security systems to identify cyber events and select necessary countermeasures. Identifying relevant information associated with cyber events is key to responding to and analyzing those events. A cyber event report includes information found during the investigation, triage, and remediation phases of a cyber event. A cyber event report would normally be constructed by an IT analyst by reviewing notes and finding the necessary associated IT information (e.g., information from system logs, etc.).

In a large organization, when a cyber event is detected, two actions must take place. First, a remedial (or triage) action must be taken in response to the cyber event. And second, a report has to be prepared regarding the cyber event. The remedial action may include disabling the credential of a user who caused the cyber event to be generated, taking a database or server offline, and/or any other action that is needed to block unauthorized data access or network disruption. The report associated with the cyber event may be a document or a collection of documents that provide information concerning the cyber event. The report may be used to provide further information about the cyber event, which can be used to investigate in depth the circumstances surrounding the event. Furthermore, the report may be used to justify the action that was taken in response to the event.

A challenge faced by IT analysts today is that the preparation of cyber event reports is time-consuming and prone to human error. For example, cyber events may be generated in the systems of different customers, and there may be many different types of cyber events that can be generated. Moreover, each customer may have different requirements for what information needs to be included in a report for the same cyber event. When an IT analyst is tasked with handling cyber events for multiple customers at the same time, it may be difficult for the IT analyst to keep track of whether a cyber event report includes all information that is required by a customer or includes information that is prohibited by the customer.

Moreover, setting customer requirements aside, it may be time-consuming and difficult to find relevant information (e.g., system log information) that needs to be included in the report for a cyber event. A large system may be configured to generate large volumes of the log data, and sifting through the data to identify portions that are suitable for inclusion in a cyber event report may be quite time-consuming for an IT analyst.

According to user research conducted in the in-house SOC in 2017, 80% of analysts' time is spent performing tasks manually, with little optimization. Cyber event reporting is one of many time-consuming and pain-staking processes for the analyst or other IT professionals. An IT analyst may handle anywhere between 15 and 30 cyber events every day. Such a large number of events makes it difficult for the analyst to keep track of what information needs to be included in which report, and introduces the possibility of human error.

According to the present disclosure, a security monitor 302 is provided (shown in FIGS. 3 and 4) that automates (partially or fully) the generation of cyber event reports. Unlike conventional systems, the system disclosed herein leverages multiple forms of machine learning and contextual understanding. Furthermore, the system provides a feedback look mechanism to learn and improve over time. Importantly, the system is capable of auto-selecting log information (as well as other information) that needs to be included in a cyber event report. The system is advantageous because it may improve the quality of IT reports that are generated by IT analysts while reducing the time it takes to generate those reports.

FIG. 1 is a diagram of an example of a cyber event report 100, according to aspects of the disclosure. The report 100 may include one or more of an identifier of type 102 of a cyber event, an identifier 104 of the cyber event, a timestamp 106 that is associated with the cyber event, an identifier 108 of data that is affected by the cyber event, an identifier 110 of a system component that is affected by the cyber event. The report 100 may further include a username 112, which corresponds to a user that caused the cyber event to be generated or a user who is affected by the cyber event. The report 100 may further include an IP address 114 of a system where the event occurred. The report may further include an indication of the action that is taken in response 116. Finally, the report may include one or more system logs 118. The term "system log" as used throughout the disclosure shall refer to one or more of a log file, a portion of a log file, the contents of a log file, or a portion of the contents of a log file, or logged data that is streamed (by a customer system) to the security monitor 302 in a data stream. The data stream may include any data concerning the operation of a system, including any data that would normally be logged for the purposes of security auditing or other purposes. Although the report 100 is depicted as an integral object, it will be understood that the report 100 may include a collection of files or objects, in some implementations.

FIG. 2 is a diagram of an event model 200, according to aspects of the disclosure. The event model 200 specifies the minimum amount of information (or the types of information) that must be included in the report for a given type of cyber event (e.g., an exploit). In operation, when the security monitor 302 generates a report for a particular cyber event, the security monitor 302 may retrieve the model for this event, and use the retrieved model to identify information that needs to be included in the report. Afterwards, the security monitor 302 may use artificial intelligence (AI) or other information theoretic algorithms to identify additional information that needs to be included in the report and/or assess the quality of the report.

Figure 3:
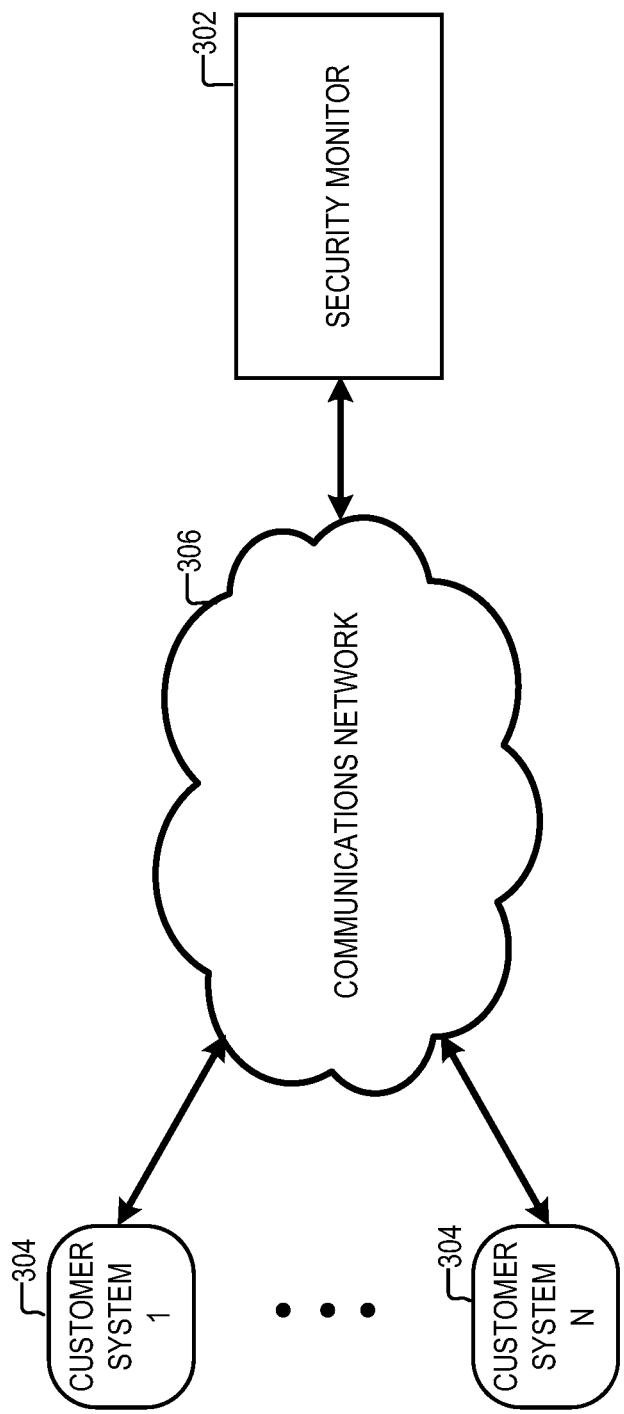
FIG. 3 is a diagram of an example of a system, according to aspects of the disclosure.

FIG. 3 illustrates the operation of the security monitor 302 in further detail. As illustrated, the security monitor 302 may be connected to one or more customer systems 304 via a communications network 306. The communications network 306 may include the Internet, a local area network (LAN), and/or any other suitable type of network. Each of the systems 304 may include one or more (1) network infrastructure (e.g., switches, gateways, routers, etc.) and (2) electronic devices that are interconnected to one another via the network infrastructure (e.g., laptops, desktops, Internet-of-things (IoT) devices, printers, etc.). Each of the systems 304 may belong to a different customer. For example, any of the systems 304 may belong to a government agency or a financial institution. In operation, the security monitor 302 may receive large data streams that are generated by the systems 304 and process the data streams to identify cyber events. For each of the cyber events, the security monitor 302 may generate a report. As noted above, a data stream that is received at the security monitor 302 from any of the customer systems 304 may include any information that is normally logged in a computer system/network. Such information may identify data accesses, unauthorized use of USB devices, a list of users who log in and out of the system, CPU usage, memory usage, and so forth.

Figure 4:
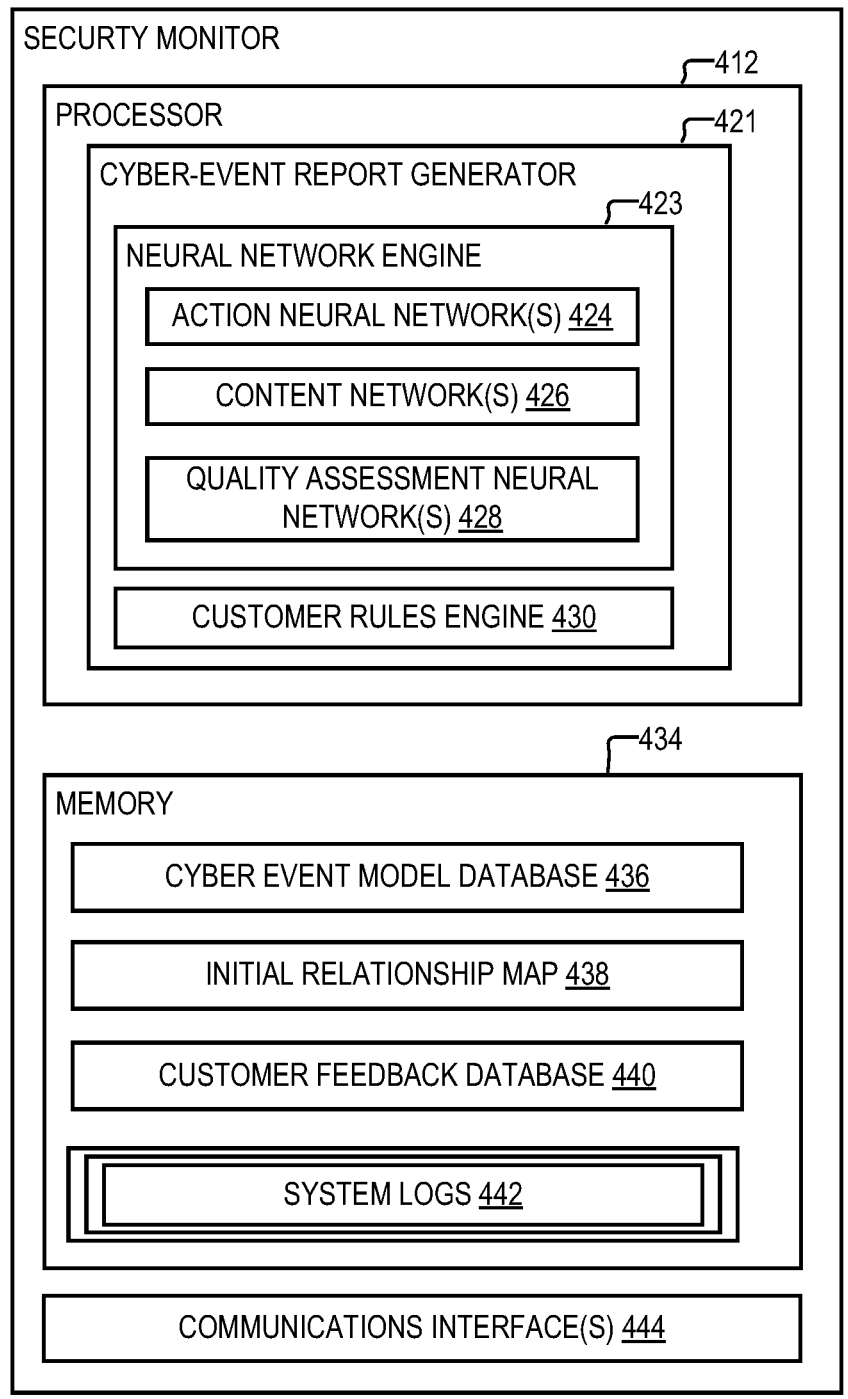
FIG. 4 is a diagram of an example of a security monitor, according to aspects of the disclosure.

FIG. 4 is a diagram of the security monitor 302, according to aspects of the disclosure. The security monitor 302 may include a processor 412, a memory 434, and a communications interface 444. The processor 412 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 434 may include any suitable type of volatile and/or non-volatile memory. In some implementations, the memory 130 may include one or more of a random-access memory (RAM), a dynamic random memory (DRAM), a flash memory, a hard drive (HD), a solid-state drive (SSD), a network accessible storage (NAS), and or any other suitable type of memory device. The communications interface 444 may include any suitable type of communications interface, such as one or more Ethernet adapters, one or more Wi-Fi adapters (e.g., 802.1414 adapters), and one or more Long-Term Evolution (LTE) adapters, for example. Although in the example of FIG. 4 the security monitor 302 is an integrated system, alternative implementations are possible in which the security monitor is a distributed system including a plurality of computing devices that are connected to one another via a communications network.

The processor 412 may be configured to execute a report generator 421. The report generator 421 may include a neural network engine 423 and a customer rules engine 430. The neural network engine 423 may include one or more neural networks 424, one or more neural networks 426, and a neural network 428. The neural networks 424 may be configured to identify an action that needs to be executed in response to a cyber event. The neural networks 426 may be used to identify system logs or other data that needs to be included in a report for the cyber event. And the neural network 428 and other information theoretic algorithms may be used to assess the quality of the report. The customer rules engine 430 may be used to ensure that the report does not include information that is prohibited by a customer or lacking information that is required by the customer. In other words, the customer rules engine 430 may evaluate a plurality of rules concerning the contents of a report to determine if the report is in compliance with those rules.

The memory 434 may store a model database 436, an initial relationship map 438, a customer feedback database 440, and a plurality of system logs 442. The model database 436 may include a plurality of models for different types of cyber events and/or different customers. Any of the models may be the same or similar to the model 200, which is discussed above with respect to FIG. 2. The initial relationship map 438 may include one or more graphs. Each graph may identify the relationship between known cyber events of the same type and cyber event reports that are generated for the cyber events. The cyber event reports and other information in each graph may be associated with the same customer. The customer feedback database 440 may identify a plurality of cyber event reports. For each of the cyber event reports, the customer feedback database 440 may identify if there have been follow-up actions by the customer to which the report was submitted. The customer feedback database 440 may be used to correlate the presence of different items of information in a report with customer satisfaction with the report. According to the present disclosure, the number of customer follow-ups to a report is used as a measure of the quality of the report. The fewer the follow-ups, the greater the customer satisfaction with the report, and thus the greater the quality of the report. A customer follow-up to a cyber event report may include one or more of: (i) a request to provide more information about the cyber event in addition to what is available in the report, a (ii) request to clarify information that is provided in the report.

The system logs 442 may include any system log that is recorded in the customer systems 304. Although the system logs 442 are depicted as being stored on the security monitor 302, it will be understood that they may be stored in the customer systems 304 and accessed remotely. In instances in which the system logs 442 stored in the security monitor 302, they may contain information that is streamed to the security monitor 302 from the customer systems 304.

Figure 5:
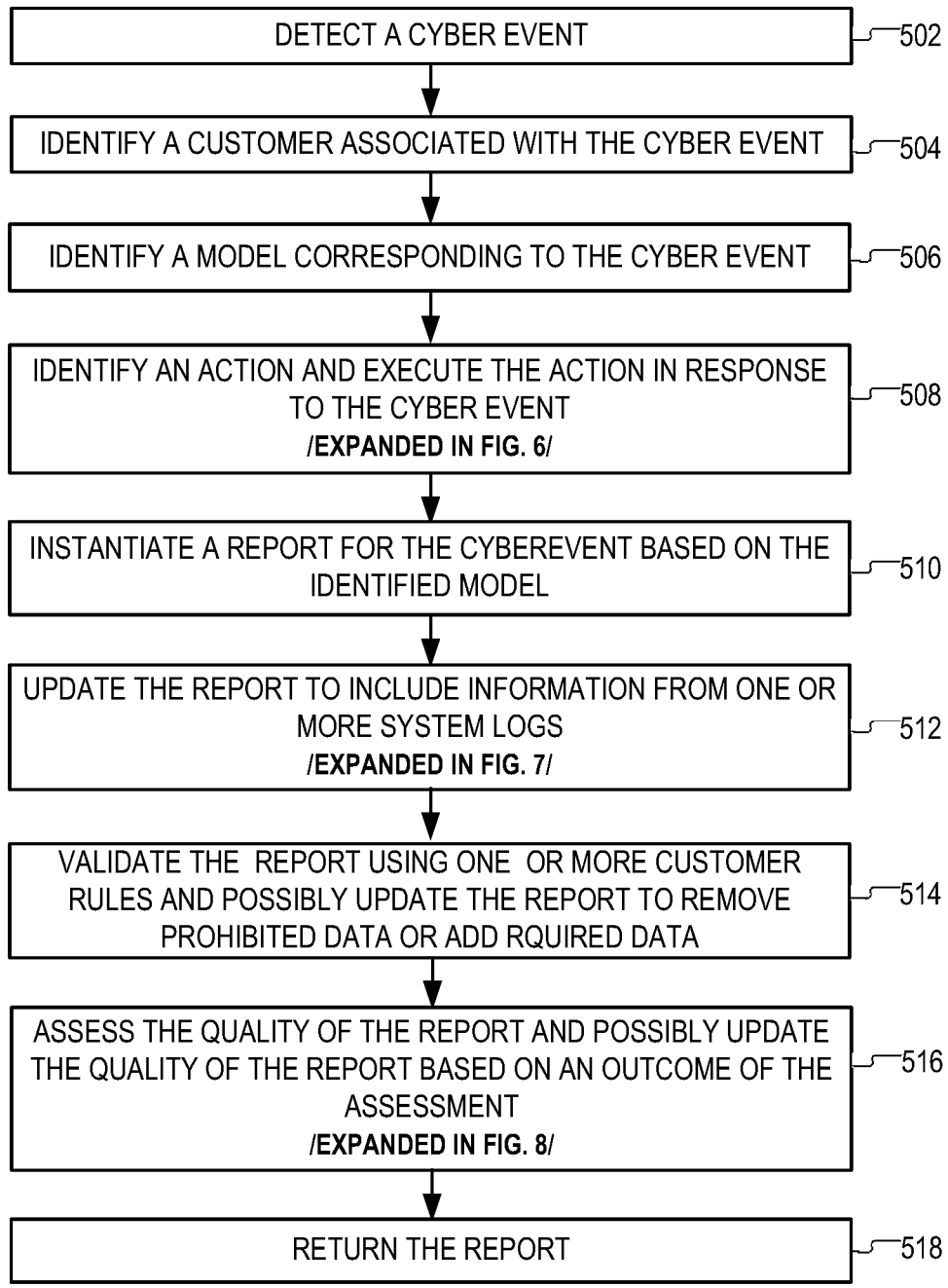
FIG. 5 is a flowchart of an example of a process, according to aspects of the disclosure.

FIG. 5 is a flowchart of an example of a process 500, according to aspects of the disclosure. According to the present disclosure, the process 500 is executed by the security monitor 302 (and/or the report generator 421). However, the present disclosure is not limited to any specific type of entity executing the process 500. At step 502, a cyber event is detected. At step 504, a customer associated with the event is identified. At step 506, a report model corresponding to the event is identified. The report model may be the same or similar to the model 200, which is discussed above with respect to FIG. 2. In some implementations, the identified model may be specific to the customer in whose system the cyber event occurred (e.g., the customer identified at step 504). At step 508, an action is identified and executed in response to the cyber event. The action may be a countermeasure designed to stop an attack or disrupt any activity that caused the cyber event to be generated. In some implementations, step 508 may be executed in accordance with a process 600, which is discussed further below with respect to FIG. 6. At step 510, a report is instantiated for the cyber event based on the model (identified at step 506). Instantiating the report may include instantiating one or more objects or files that would contain information corresponding to the cyber event. In some implementations, the report may be instantiated based on the model (identified at step 506). At step 512, the report is updated to include information from one or more system logs. In some implementations, step 512 may be executed in accordance with a process, 700, which is discussed further below with respect to FIG. 7. At step 514, the report is validated using one or more rules that specify what information needs to be included in the report or what information cannot be included in the report. If the evaluation of any of the rules results in a determination that the report includes an item of information that is prohibited, this item of information is removed from the report. If the evaluation of any of the rules results in a determination that the report is lacking a required item of information, this item of information is added to the report. The validation of the report may be performed by using a customer rules engine, such as the customer rules engine 430. At step 516, the quality of the report is assessed, and the report may be updated when the quality of the report is deemed insufficient. Step 516 may be executed in accordance with a process 800, which is discussed further below with respect to FIG. 8. At step 518, the report is returned. Returning the report may include displaying the report on a display screen of the security monitor 302 to allow an IT analyst to make final edits before submitting the report to a customer. Additionally or alternatively, returning the report may include transmitting the report, over a communications network, to a remote device (e.g., a device of the customer or a device of an IT analyst).

Figure 6:
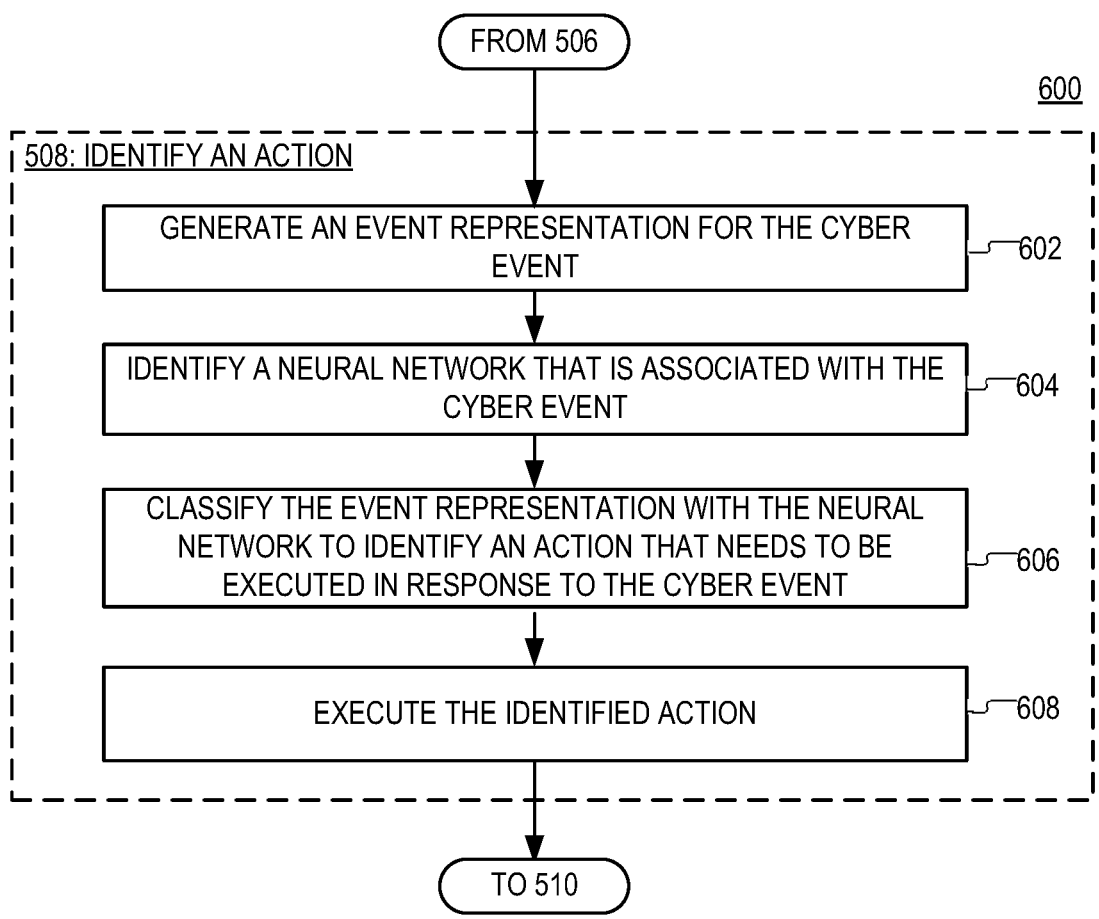
FIG. 6 is a flowchart of an example of a process, according to aspects of the disclosure.

FIG. 6 is a flowchart of an example of a process 600 for identifying an action (or countermeasure) in response to a cyber event, as specified by step 508 of the process 500.

At step 602, a representation of the cyber event (detected at step 502) is generated. The representation of the cyber event may be a vector or signature that identifies (or encodes) a plurality of features of the cyber event (detected at step 502). The representation of the cyber event may encode (or indicate) any suitable type of information about the cyber event. The representation of the cyber event may encode (or indicate) one or more of: (a) a type of the cyber event, (ii) time when the cyber event occurred, (iii) type of network where the cyber event occurred, (iv) an amount of data that was compromised by the event, (v) duration of activity that gave rise to the event, (vi) type of device where the event occurred or which was affected by the event (vii) a network domain where the event occurred, and/or (viii) type of information that was in the process of being exfiltrated when the cyber event was generated. For example, the event representation may indicate whether the event affected an IoT device, a switch, a router, a laptop, or a printer—i.e., it can identify the type of device affected by the event. As another example, the event representation may indicate whether the event affected a first domain (i.e., a high sensitivity domain) or a second domain (e.g., a low sensitivity domain) of a network. As another example, the event may identify the type of information that is associated with the event (e.g., type of information that was targeted by activity associated with the event).

In some implementations, the event representation may include information regarding other cyber events that are occurring concurrently with the cyber event (detected at step 502) in the same customer system (or the same portion, or domain, of the customer system). According to the present disclosure, two cyber events are deemed to occur concurrently if they are generated within a predetermined time period (e.g., within 10 minutes of each other). In this regard, the representation of the cyber event may include one or more of: (it) identification of a count of additional cyber events that are generated concurrently with the cyber event (detected at step 502) and/or an identification of the type of the additional events.

Including information about concurrent cyber events is advantageous because it enables the neural network (discussed with respect to step 604) to account for whether the cyber event (detected at step 502) occurred in isolation or is part of a broad pattern of cyber events. Whether an event is part of a pattern of events can bear on the type of action/countermeasure that is chosen (by the neural network) in response to the event. Consider an example in which a cyber event is detected in response to a large amount of data being accessed. If the event is generated in isolation from other events, a first action may be taken in response to the event (e.g., denying network access to the user who is accessing the data). However, if the event is accompanied by another cyber event, such as one that is generated in response to an unauthorized insertion of a USB drive into a computer, another action may need to be taken, such as blocking all USB ports or shutting down of the user's computer.

In some implementations, the event representation may include a plurality of bits. Each bit may correspond to a different event characteristic. If the bit is set to a first value, this could mean that the characteristic is possessed by the event. If the bit is set to a second value, this could mean that the characteristic is not possessed by the event. For example, a bit in an event representation may be associated with a particular network domain. If the bit is set to '1', this would indicate that this network domain was affected by the event. Otherwise, if the bit is set to '0', this would indicate that the domain is unaffected by the event. As another example, a bit in an event representation may be associated with a particular information type (e.g., browser data). If the bit is set to '1', this would indicate that the event was associated with an attack targeting browser data. Otherwise, if the bit is set to '0', this would indicate that the event is not associated with browser data. As another example, a bit in an event representation may be associated with a particular type of concurrent cyber event. If the bit is set to '1', this would indicate that the event detected at step 502 (e.g., unauthorized data access) is generated concurrently with a second event (e.g., a cyber event that is generated when a USB stick is inserted into a device). If the bit is set to '0', this would indicate that the event detected at step 502 is not generated concurrently with the second event.

It will be understood that the present disclosure is not limited to any specific type of information being included in the event representation and/or any specific format for the event representation. It will be clear to those of ordinary skill in the art, after reading this disclosure, that there are various ways in which an event representation may be generated, depending on the type of neural network used to classify the event representation and/or the event.

At step 604, a neural network associated with the cyber event (detected at step 502) is identified. The neural network may be the same or similar network to any of the neural networks 424, which are discussed above with respect to FIG. 4. The neural network may be a feed-forward network, a convolutional neural network, a recurrent neural network, and/or any other suitable type of neural network. The neural network may be configured to classify the event signature (generated at step 602) into one of a plurality of categories. Each of the categories may correspond to a different action that can be taken in response to the cyber event (detected at step 502). Consider an example in which the cyber event is generated when unauthorized access of data is detected. In this example, the neural network associated with the event may be configured to classify the representation of the event into the following categories: (i) a category associated with disabling the credentials of a user who is performing the unauthorized access, (ii) a category associated with taking offline the server that is being accessed, (iii) a category associated with blocking the IP address of the device that is accessing the information, or (iv) a category associated with disabling a gateway via which the information is being transferred. It will be understood that these actions/categories are provided as an example only and the present disclosure is not limited to any specific set of actions/categories.

At step 606, the event representation (generated at step 602) is classified with the neural network (selected at step 604). Classifying the event representation may include executing the neural network based on the event representation. Executing the neural network may yield a number that is indicative of the category in which the event (or event representation) is classified by the neural network. Alternatively, executing the neural network may yield a set of probability values, where each of the probability values corresponds to a different category. In the latter case, the event representation may be considered to be classified into the category having the largest probability number.

At step 608, the action associated with the category in which the event is classified is executed.

In some implementations, the neural network (identified at step 604) may include a "no action" category. When the event representation (generated at step 602) is classified in the "no action" category, no action may be taken in response to the cyber event (detected at step 502), and step 608 may be omitted. In some implementations, the neural network may be trained using a supervised learning algorithm. In such implementations, the neural network may be trained using a training data set. The training data set may be generated based on past cyber event reports for the cyber event (detected at step 502) and/or other similar cyber events. The training data set may include a plurality of training data items. Each training data item may include an event representation and a label. The label may identify (directly or indirectly) an action category or action corresponding to a cyber event that is associated with the event representation. It will be understood that the present disclosure is not limited to any specific type of training data or method for training the neural network (identified at step 604). In some implementations, the neural network (identified at step 604) may be trained to select a response/countermeasure to only one type of event. Alternatively, in some implementations, the neural network (identified at step 604) may be trained to select a response/countermeasure to a group of events. In some implementations, the neural network (identified at step 604) may be selected from a group of available neural networks, where each neural network in the group is trained to select a response/countermeasure to a different type of cyber event or group of cyber events.

In some implementations, the neural network (identified at step 604) may associated with the customer that corresponds to the cyber event (detected at step 502). Additionally or alternatively, in some implementations, the neural network (identified at step 604) may be selected from a group of neural networks that correspond to the event (detected at step 502). Each of the neural networks in the group may be associated with a different customer, and as such it may be trained (exclusively or predominantly) based on representations (e.g., signatures) of events that are associated with the network's respective customer.

Figure 7:
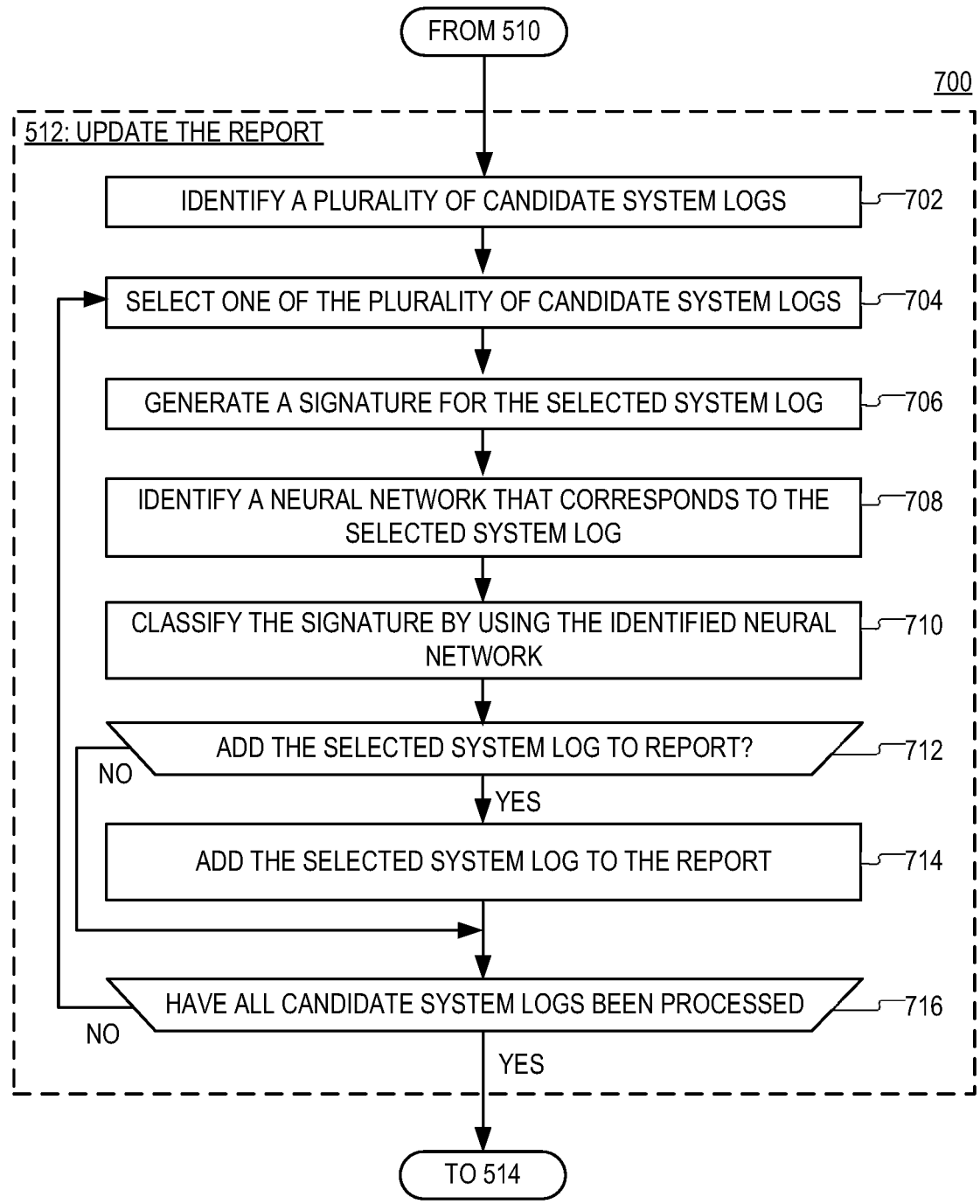
FIG. 7 is a flowchart of an example of a process, according to aspects of the disclosure.

FIG. 7 is a flowchart of a process 700 for updating a cyber event report as specified by step 512 of the process 500, according to aspects of the disclosure.

At step 702, a set of candidate system logs is identified. As noted above, the term system log may refer to a set of data that has been logged by a system. For example, a system log may include a log file, a portion of a log file, the contents of a log file, or a portion of the contents of a log file. A log file may be a text file or a binary file, and a system log may include text or binary data.

At step 704, one of the candidate system logs is selected. The selected system log may be one that has not been selected in a previous iteration of steps 704-714.

At step 706, a signature for the system log is generated. The signature may include a representation of the system log. Optionally, the signature may also include a representation of the event (generated at step 502) or another event that is generated concurrently with the event generated at step 502. Any of the event representations may be generated as discussed above with respect to step 602 of the process 600. The representation of the system log may be a vector or signature that identifies (or encodes) a plurality of features of the system log. In some implementations, the representation of the system logs may be generated using a natural language processing model, such as text2vec, etc. Alternatively, the representation of the system log may be generated by using another model. For example, the representation of the system log may include one or more bits (or groups of bits). Each of the bits or groups of bits may correspond to a different type of log entry that is present in the system log and/or the value of the log entry. In some implementations, the representation of the system log may include any of the information that is included in the event representation (discussed with respect to step 602).

Including, in the system log signature, information about the cyber event (detected at step 502) is advantageous because it enables the neural network (identified at step 708) to take into account the specifics of the cyber event when determining whether to add the system log (selected at step 704) to the report for the cyber event. Consider an example in which a cyber event is generated in response to a high CPU load on a particular system. If the event is generated during the night, the event may require a log of the amount of data was being retrieved from the system. However, if the event is generated during the day, when it is normal for large amounts of data to be drawn from the system, the same log may not be needed. This example is provided for illustrative purposes only.

Including, in the system log signature, information about concurrent cyber events is advantageous because it enables the neural network (discussed with respect to step 708) to account for whether the cyber event (detected at step 502) occurred in isolation or is part of a broad pattern of cyber events. Whether an event is part of a pattern of events can bear on whether a particular system log needs to be included in the report for the event. Consider an example in which a cyber event is detected in response to a large amount of data being accessed and the system log (selected at step 704) is a list of USB devices that have been plugged into the system that has been downloading the data. If the event is generated in isolation from other events, the system log would not need to be included in the report for the event (detected at step 502). However, if the event is accompanied by another cyber event, such as one that is generated in response to an unauthorized insertion of a USB drive into a computer, the system log may need to be included.

It will be understood that the present disclosure is not limited to any specific type of information being included in the system log signature. It will be further understood that the present disclosure is not limited to any specific format of the system log signature.

At step 708, a neural network that is associated with the selected system log is identified. The neural network may be the same or similar network to any of the neural networks 426, which are discussed above with respect to FIG. 4. The neural network may be a feed-forward neural network, a convolutional neural network, a recurrent neural network, and/or any other suitable type of neural network. It will be understood that the present disclosure is not limited to any specific type of configuration of the neural network. The neural network may be configured to classify the system log signature (generated at step 706) into one of an "include category" and a "do not include category". In other words, the neural network may be arranged to determine whether to add the system log (selected at step 702) to the report (instantiated at step 510). In some implementations, the neural network may be selected from a group of neural networks, where each neural network is configured to consider a different type of system log (or a different group of system log types). In some implementations, information theoretic algorithms will process the log to determine if the informational content score indicates that is designated as "include" or "do not include" category.

At step 710, the system log signature (generated at step 706) is classified with the neural network (identified at step 708). Classifying the event representation may include executing (or evaluating) the neural network based on the signature. In some implementations, executing the neural network may yield a number that indicative of the category in which the system log (or system log signature) is classified by the neural network. For example, an output of '1' by an output node of the neural network may correspond to an "include" category, and an output of '0' by the same output node may correspond to a "do not include category." As another example, as a result of the classification, the neural network may output a decimal number between 1 and 0, which is indicative of how desirable it is to include the system log into the report (instantiated at step 510). For example, a value of 0.8 may indicate that it is highly recommended to add the system log to the report, and a number of 0.1 may indicate that it is hardly recommended to add the system log to the report. If the decimal number is above a threshold, the system log signature may be considered classified in an "include" category. On the other hand, if the decimal number is below a threshold, the system log signature may be considered classified in a "do not include" category. As another example, executing the neural network may yield a set of probability values, where each of the probability values corresponds to a different category. In the latter case, the system log signature may be considered to be classified into the category having the largest probability number.

At step 712, a determination is made whether to include the system log (selected at step 704) into the report (instantiated at step 510). The determination may be made based on the value that is yielded by the neural network at step 710. For example, if the neural network yields one value (e.g., '1') a determination may be made to add the system log to the report. As another example, if the neural network yields another value (e.g., '0'), a determination may be made to not add the system log to the report. Alternatively, in some embodiments, the output of the neural network may be compared to a threshold. If the output is above the threshold, a determination may be made to add the system log to the report. Otherwise, if the output is below the threshold, a determination may be made to not add the system log to the report. If a determination is made to add the system log to the report, the process 700 proceeds to step 714. Otherwise, the process 700 proceeds to step 716.

At step 714, the process 700 adds the system log (selected at step 704) to the report.

At step 716, a determination is made if all of the candidate system logs (identified at step 702) have been processed. If all of the candidate system logs have been processed, the process 700 returns to step 514. Otherwise, steps 704-716 are repeated for another one of the candidate system logs.

Although the process 700 is identified in the context of system logs, it will be understood that in some instances, the process 700 may be used with respect to any other type of data. In such implementations, step 702 may involve identifying a plurality of candidate data items (other than or including a system log); step 706 may involve generating a signature of a selected data item; step 710 may include classifying the selected data item with a neural network; and step 712 may involve deciding whether to include the data item into a cyber event report based on the outcome of the classification. Stated succinctly, the process 700 can be used to determine whether to include, in a cyber event report, other types of data in addition to system logs.

In some implementations, the neural network (identified at step 708) may be trained using a supervised learning algorithm. In such implementations, the neural network may be trained using a training data set. The training data set may be generated based on past cyber event reports for the cyber event (detected at step 502) and/or other similar cyber events. The training data set may include a plurality of training data items. Each training data item may include a system log signature and a label that corresponds to the system log signature. The label may identify (directly or indirectly) a category associated with a system log that is associated with the system log signature. It will be understood that the present disclosure is not limited to any specific type of training data or method for training the neural network (identified at step 708). In some implementations, the neural network (identified at step 708) may be trained to classify only one type of system log. Alternatively, in some implementations, the neural network (identified at step 708) may be trained to classify a group of system logs.

In some implementations, the neural network (identified at step 708) may associated with the customer that corresponds to the cyber event (detected at step 502). Additionally or alternatively, in some implementations, the neural network (identified at step 708) may be selected from a group of neural networks that correspond to the selected system log. Each of the neural networks in the group may be associated with a different customer, and as such it may be trained (exclusively or predominantly) based on signatures for system logs that have been submitted to the network's respective customer.

Figure 8:
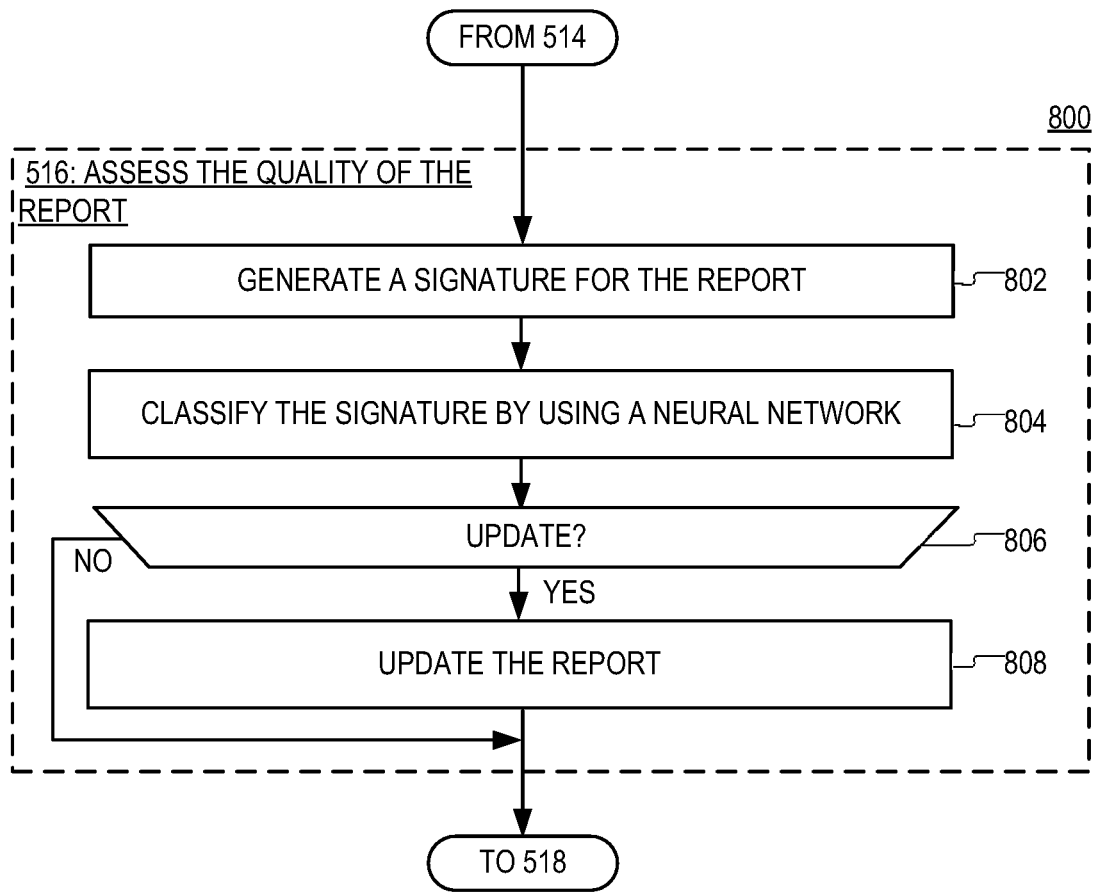
FIG. 8 is a flowchart of an example of a process, according to aspects of the disclosure.

FIG. 8 is a flowchart of an example of a process 800 for assessing the quality of a cyber event report, as specified by step 516 of the process 500.

At step 802, a signature for the report (updated at step 512) is generated. The signature may be a vector that identifies a plurality of features of the report.

At step 804, the signature for the report is classified with a neural network. The neural network may be the same or similar to the neural network 428. Classifying the event representation may include executing the neural network based on the signature. In some implementations, executing the neural network may yield a quality score for the report (or report signature).

At step 806, a determination is made whether to update the report. The determination is made based on the quality score calculated at step 806. If the quality score is above a threshold, the process 800 proceeds to step 808. Otherwise, the process 800 returns to step 516.

At step 808, the report is updated to improve its quality score. The report may be updated either manually or by executing the process 700 again. It will be understood that the present disclosure is not limited to any specific method for updating the report.

The neural network used at step 804 may be the same or similar to the neural network 428, which is discussed above with respect to FIG. 4. The neural network may be a feed-forward network, a convolutional neural network, a recurrent neural network, and/or any other suitable type of neural network. The neural network may be trained using a supervised learning algorithm and a training data set. The training data set may include a plurality of training data items. Each training data item may include a signature for a report that has been submitted in the past (to the customer identified at step 504), and a quality score for the report. The quality score may be generated manually. The quality score may be inversely proportional to the amount of feedback (or follow-ups) received from the customer and/or any other suitable type of information. The amount of feedback (or follow-ups) received may be determined by using a database, such as the customer feedback database 440, which is discussed above with respect to FIG. 4. In some implementations, the neural network (used at step 904) may be specific to the customer associated with the cyber event (detected at step 502), and it may be trained only based on past reports that have been submitted to this customer. In some implementations, the neural network may be selected from a group of neural networks, where each neural network in the group is associated with a different customer.

Figure 9:
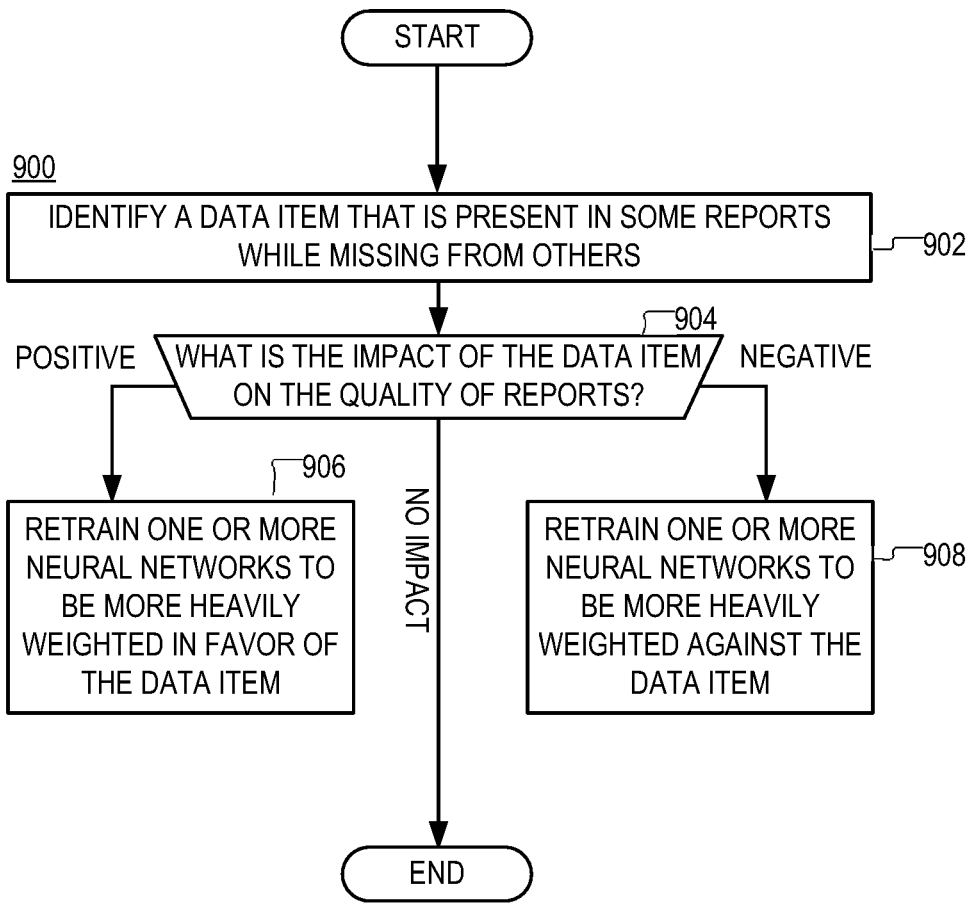
FIG. 9 is a flowchart of an example of a process, according to aspects of the disclosure.

FIG. 9 is a flowchart of an example of a process 900, according to aspects of the disclosure. According to the example of FIG. 9, the process 900 is executed by the security monitor 302 (and/or the report generator 421). However, the present disclosure is not limited to any specific type of entity executing the process 900.

At step 902, a data item is selected. The data item may be one that is present in some reports that are submitted to a particular customer and missing from other reports that are submitted to the same customer. The reports may be reports that are associated with the same type of cyber event or the same group of cyber event types. The data item may be identified by examining reports that are logged in a database, such as the customer feedback database 440. The data item may be a particular type of system log or any other suitable type of information item.

At step 904, a determination is made of whether the data item has a positive or negative impact on the quality of reports for the type of event (or group of events) that are submitted to the particular customer. The determination may be made by comparing the number of customer follow-ups received by reports including the selected data item and the number of customer follow-ups received by reports from which the selected data item is missing. Also, the data item may be processed by information theoretic algorithms to determine a score of useful information contained in item. If a non-negligible positive correlation is calculated (or otherwise found to exist) between the presence of the data item in a report and the quality of the report, the data item may be determined to have a positive impact, and the process 900 proceeds to step 906. If a non-negligible negative correlation is calculated (or otherwise found to exist) between the presence of the data item in a report and the quality of the report, the data item may be determined to have a negative impact, and the process 900 proceeds to step 908. If no correlation is found to exist between the quality of the and the presence of the data item in them, the process 900 ends.

At step 906, one or more neural networks that are associated with the data item are retrained to be more heavily weighted towards the inclusion of the data item into a report.

At step 908, the one or more neural networks that are associated with the data item are retrained to be more heavily weighted against the inclusion of the data item into a report. The one or more neural networks may be the same or similar to any of the neural networks 424. The one or more neural networks may include networks that are used for determining whether to include the data item in a cyber event report.

FIGS. 1-9 are provided as an example only. At least some of the steps discussed with respect to FIGS. 1-9 can be performed in parallel, in a different order, or altogether omitted. Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc./, imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for automatically generating a report related to one or more cyber events occurring in a computerized system, comprising:
    detecting a first cyber event;
    automatically identifying a report model corresponding to the detected first cyber event, wherein the report model identifies the minimum necessary data items for said report;
    identifying a remedial action for the detected first cyber event, performing classification processing by a remedial action neural network associated with the detected first cyber event and the identified remedial action, and automatically executing the identified remedial action for the detected first cyber event;
    instantiating a report based on the automatically identified report model, the report including an identifier corresponding to the first cyber event and said executed remedial action;
    generating a signature for a system log selected from a plurality of system logs, and classifying the signature for the system log with a content neural network corresponding to the system log; and
    updating the report by adding the system log to the report based on an outcome of the classification of the signature for the system log, wherein the system log is added to the report only when the signature for the system log is classified into a predetermined category by the content neural network corresponding to the system log.

2. The method of claim 1, wherein the signature for the system log includes a representation of contents of the system log.

3. The method of claim 1, wherein the signature for the system log includes a representation of the first cyber event and a representation of contents of the system log.

4. The method of claim 1, wherein the signature for the system log includes a representation of a second cyber event that has occurred within a predetermined period before or after the first cyber event, and a representation of contents of the system log.

5. The method of claim 1, further comprising:
    generating a signature for the remedial action;
    classifying the signature for the action with the remedial action neural network;
    executing the action based on an outcome of the classification of the signature for the remedial action, wherein the remedial action is executed only when the signature for the action is classified into a predetermined category by said remedial action neural network.

6. The method of claim 5, wherein the signature for the action includes at least one of a representation of the first cyber event and a representation of the remedial action.

7. The method of claim 1, wherein the first cyber event is generated by one of network introspection software and/or intrusion detection software.

8. A system for automatically generating a report related to one or more cyber events occurring in a computerized system comprising:
    a memory; and
    at least one processor operatively coupled to the memory, the at least one processor being configured to perform the operations of:
        detecting a first cyber event;
        automatically identifying a report model corresponding to the detected first cyber event, wherein the report model identifies the minimum necessary data items for said report;
        automatically identifying a remedial action for the detected first cyber event, performing classification processing by a remedial action neural network associated with the detected first cyber event and the identified remedial action, and automatically executing the identified remedial action for the detected first cyber event;
        instantiating a report based on the automatically identified report model, the report including an identifier corresponding to the first cyber event and said executed remedial action;
        generating a signature for a system log selected from a plurality of system logs, and classifying the signature for the system log with a content neural network corresponding to the system log; and
        updating the report by adding the system log to the report based on an outcome of the classification of the signature for the system log, wherein the system log is added to the report only when the signature for the system log is classified into a predetermined category by the content neural network corresponding to the system log.

9. The system of claim 8, wherein the signature for the system log includes a representation of contents of the system log.

10. The system of claim 8, wherein the signature for the system log includes a representation of the first cyber event and a representation of contents of the system log.

11. The system of claim 8, wherein the signature for the system log includes a representation of a second cyber event that has occurred within a predetermined period before or after the first cyber event, and a representation of contents of the system log.

12. The system of claim 8, wherein the at least one processor is further configured to perform the operation of:
    generating a signature for the remedial action;
    classifying the signature for the action with the remedial action neural network;
    executing the action based on an outcome of the classification of the signature for the remedial action, wherein the remedial action is executed only when the signature for the action is classified into a predetermined category by said remedial action neural network.

13. The system of claim 12, wherein the signature for the action includes at least one of a representation of the first cyber event and a representation of the remedial action.

14. The system of claim 8, wherein the first cyber event is generated by one of network introspection software and/or intrusion detection software.

15. A non-transitory computer-readable medium storing one or more processor-executable instructions which, when executed by at least processor, cause the at least one processor to perform the operations of:

detecting a first cyber event;

automatically identifying a report model corresponding to the detected first cyber event, wherein the report model identifies the minimum necessary data items for said report;

identifying a remedial action for the detected first cyber event, performing classification processing by a remedial action neural network associated with the detected first cyber event and the identified remedial action, and automatically executing the identified remedial action for the detected first cyber event;

instantiating a report based on the automatically identified report model, the report including an identifier corresponding to the first cyber event and said executed remedial action;

generating a signature for a system log selected from a plurality of system logs, and classifying the signature for the system log with a content neural network corresponding to the system log; and updating the report by adding the system log to the report based on an outcome of the classification of the signature for the system log, wherein the system log is added to the report only when the signature for the system log is classified into a predetermined category by the content neural network corresponding to the system log.

16. The medium of claim 15, wherein the signature for the system log includes a representation of contents of the system log.

17. The medium of claim 15, wherein the signature for the system log includes a representation of the first cyber event and a representation of contents of the system log.

18. The medium of claim 15, wherein the signature for the system log includes a representation of a second cyber event that has occurred within a predetermined period before or after the first cyber event, and a representation of contents of the system log.

19. The medium of claim 18, wherein the one or more processor-executable instructions, when executed by at least one processor, further cause the at least one processor to perform the operations of:

generating a signature for the remedial action;

classifying the signature for the action with the remedial action neural network;

executing the action based on an outcome of the classification of the signature for the remedial action, wherein the remedial action is executed only when the signature for the action is classified into a predetermined category by said remedial action neural network.

20. The medium of claim 15, wherein the signature for the action includes at least one of a representation of the first cyber event and a representation of the remedial action.

21. The method of claim 1, further comprising:
identifying a customer associated with or impacted by the cyber event;
querying a computerized customer rules engine to obtain rules for the identified customer; and
validating the generated report using the obtained rules for the identified customer.

22. The method of claim 21, wherein the validation of the generated report includes removing at least one prohibited data item or adding at least one additional required data item based on execution of computer instructions for performing analysis of the obtained rules for the identified customer.

23. The method of claim 1, further comprising:
identifying a customer associated with a cyber event;
querying a customer feedback database for the identified customer and obtaining customer's past feedback data; and
assessing a quality of the report using a quality assessment neural network that performs analysis of the generated report using the obtained customer's past feedback data.

24. The system of claim 8, wherein the at least one processor is further configured to perform the operation of:
identifying a customer associated with or impacted by the cyber event;
querying a computerized customer rules engine to obtain rules for the identified customer; and
validating the generated report using the obtained rules for the identified customer.

25. The system of claim 24, wherein the validation of the generated report includes removing at least one prohibited data item or adding at least one additional required data item based on execution of computer instructions for performing analysis of the obtained rules for the identified customer.

26. The system of claim 8, further comprising:
identifying a customer associated with a cyber event;
querying a customer feedback database for the identified customer and obtain customer's past feedback data; and
assessing a quality of the report using a quality assessment neural network that performs analysis of the generated report using the obtained customer's past feedback data.

27. The medium of claim 15, further storing one or more processor-executable instructions which, when executed by at least processor, cause the at least one processor to perform the operations of:
identifying a customer associated with or impacted by the cyber event;
querying a computerized customer rules engine to obtain rules for the identified customer; and
validating the generated report using the obtained rules for the identified customer.

28. The medium of claim 27, wherein the validation of the generated report includes removing at least one prohibited data item or adding at least one additional required data item based on execution of computer instructions for performing analysis of the obtained rules for the identified customer.

29. The medium of claim 28, further storing one or more processor-executable instructions which, when executed by at least processor, cause the at least one processor to perform the operations of:
identifying a customer associated with a cyber event;
querying a customer feedback database for the identified customer and obtain customer's past feedback data; and
assessing a quality of the report using a quality assessment neural network that performs analysis of the generated report using the obtained customer's past feedback data.

* * * * *